US009840435B2

(12) United States Patent
Ohara et al.

(10) Patent No.: US 9,840,435 B2
(45) Date of Patent: Dec. 12, 2017

(54) DISPLAY COVER GLASS AND DISPLAY COVER GLASS FABRICATION METHOD

(71) Applicant: ASAHI GLASS COMPANY, LIMITED, Chiyoda-ku (JP)

(72) Inventors: Seiki Ohara, Tokyo (JP); Kazutaka Ono, Tokyo (JP); Tetsuya Nakashima, Tokyo (JP); Hiroyuki Ohkawa, Tokyo (JP)

(73) Assignee: ASAHI GLASS COMPANY, LIMITED, Chiyoda-ku (JP)

( * ) Notice: Subject to any disclaimer, the term of this patent is extended or adjusted under 35 U.S.C. 154(b) by 221 days.

(21) Appl. No.: 14/301,690

(22) Filed: Jun. 11, 2014

(65) Prior Publication Data

US 2014/0370264 A1 Dec. 18, 2014

Related U.S. Application Data

(63) Continuation of application No. PCT/JP2012/078320, filed on Nov. 1, 2012.

(30) Foreign Application Priority Data

Dec. 16, 2011 (JP) ................................ 2011-276203

(51) Int. Cl.
*C03C 21/00* (2006.01)
*G06F 1/16* (2006.01)
(Continued)

(52) U.S. Cl.
CPC ............ *C03C 21/002* (2013.01); *C03C 3/085* (2013.01); *C03C 3/093* (2013.01); *C03C 23/007* (2013.01);
(Continued)

(58) Field of Classification Search
CPC ............... C03B 27/00–27/067; Y10T 428/315
(Continued)

(56) References Cited

U.S. PATENT DOCUMENTS 8,168,295 B2 5/2012 Murata
8,561,429 B2 10/2013 Allan et al.
(Continued)

FOREIGN PATENT DOCUMENTS

CN 102015566 A 4/2011
JP 54-83923 7/1979
(Continued)

OTHER PUBLICATIONS

International Search Report dated Dec. 18, 2012 in PCT/JP2012/078320 filed Nov. 1, 2012.

*Primary Examiner* — Aaron Austin
*Assistant Examiner* — Laura Figg
(74) *Attorney, Agent, or Firm* — Oblon, McClelland, Maier & Neustadt, L.L.P.

(57) ABSTRACT

The present invention provides a cover glass for a display, having high durability to slow cracking and strong abraded strength even though a compressive stress is large and a depth of a compressive stress layer is deep. The present invention relates to a cover glass for a display, in which a depth of a compressive stress layer (DOL) is 30 μm or more, a surface compressive stress is 300 MPa or more, a position (HW) at which a compressive stress is half of a value of the surface compressive stress is a position of 8 μm or more from a glass surface, and the depth of the compressive stress layer (DOL) and the position (HW) at which the compressive stress is half of the value of the surface compressive stress satisfy the following formula:

$$0.05 \leq HW/DOL \leq 0.23 \quad (1).$$

8 Claims, 11 Drawing Sheets

SCRATCH
COMPRESSIVE STRESS LAYER
GLASS
COMPRESSIVE STRESS LAYER
MIRROR SURFACE

(51) Int. Cl.

| | |
|---|---|
| ***G06F 3/041*** | (2006.01) |
| ***C03C 3/085*** | (2006.01) |
| ***C03C 3/093*** | (2006.01) |
| ***C03C 23/00*** | (2006.01) |

(52) U.S. Cl.
CPC ............ *G06F 1/1626* (2013.01); *G06F 3/041* (2013.01); *Y10T 428/315* (2015.01)

(58) Field of Classification Search
USPC .......................................................... 428/220
See application file for complete search history.

(56) References Cited

U.S. PATENT DOCUMENTS

| | | | | |
|---|---|---|---|---|
| 8,679,631 | B2 | 3/2014 | Murata | |
| 2009/0197088 | A1* | 8/2009 | Murata | C03C 3/083 428/410 |
| 2009/0325776 | A1 | 12/2009 | Murata | |
| 2010/0009154 | A1* | 1/2010 | Allan | C03C 3/085 428/220 |
| 2010/0167059 | A1 | 7/2010 | Hashimoto et al. | |
| 2011/0318571 | A1 | 12/2011 | Murata | |
| 2011/0318572 | A1 | 12/2011 | Murata | |
| 2012/0141760 | A1 | 6/2012 | Murata | |
| 2012/0141801 | A1 | 6/2012 | Murata | |
| 2012/0251827 | A1 | 10/2012 | Murata | |
| 2013/0045386 | A1 | 2/2013 | Murata | |

FOREIGN PATENT DOCUMENTS

| | | |
|---|---|---|
| JP | 2002-174810 | 6/2002 |
| JP | 2004-359504 | 12/2004 |
| JP | 2008-115071 | 5/2008 |
| JP | 2009-57271 A | 3/2009 |
| JP | 4289927 | 4/2009 |
| JP | 4289931 | 4/2009 |
| JP | 2011-105598 | 6/2011 |
| KR | 10-2011-0036828 A | 4/2011 |
| WO | 2004/106253 | 12/2004 |
| WO | 2009/019965 | 2/2009 |
| WO | WO 2010/005578 A1 | 1/2010 |

* cited by examiner

*Fig. 11A*
*Fig. 11B*
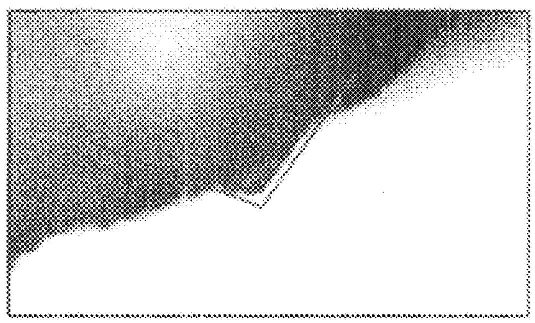
*Fig. 11C*
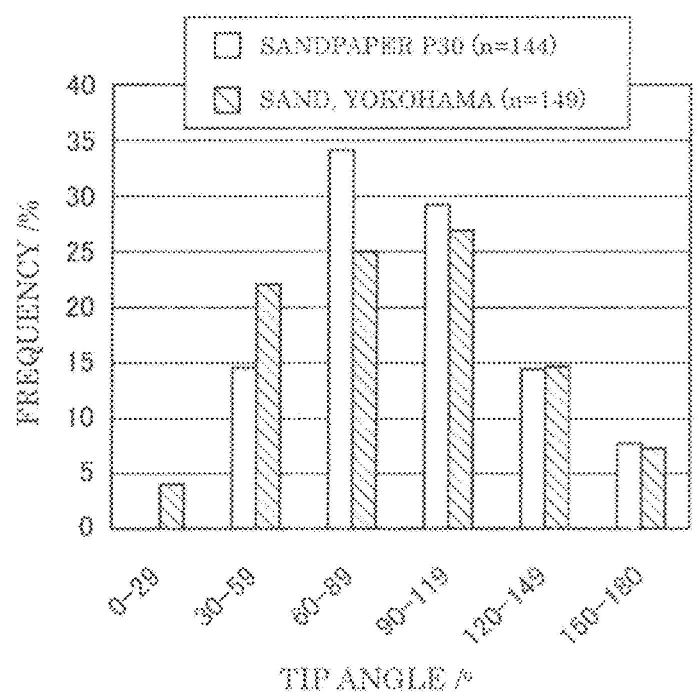

DISPLAY COVER GLASS AND DISPLAY COVER GLASS FABRICATION METHOD

TECHNICAL FIELD

The present invention relates to a cover glass for a display suitable for a cover glass of the display device such as a mobile device etc. such as mobile phones and personal digital assistants (PDA), and a method for manufacturing the cover glass for a display.

BACKGROUND ART

In recent years, in order to enhance protection or beauty of a display in flat panel display devices such as mobile phones and personal digital assistants (PDA), a thin sheet-shaped cover glass is arranged on the front surface of a display such that the area of the cover glass is wider than an image display part. Reduction in weight and reduction in thickness are required in such a flat panel display device, and to achieve the requirement, a thickness of a cover glass used for display protection is required to be decreased.

However, when the thickness of a cover glass is decreased, strength of the cover glass is decreased, and in some cases, the cover glass itself breaks by drop during using or carrying a display device, and there was a problem that an original role of protecting a display device cannot be performed.

For this reason, in the conventional cover glass, scratch resistance of a cover glass was increased by chemically strengthening a glass sheet to form a compressive stress layer on the surface thereof (JP-A-2011-105598). In order to increase mechanical strength of a glass substrate, it is necessary to impart large compressive stress to a glass surface (JP-A-2008-115071). Furthermore, in order to increase mechanical strength, it is proposed to deepen a compressive stress layer (JP-A-2002-174810).

On the other hand, in order to improve cutting properties of a glass, Japanese Patent No. 4289931 describes a method for manufacturing a chemical strengthened glass, comprising after ion-exchanging, conducting a dipping treatment at a temperature higher than that of a first dipping treatment, and then conducting a heat treatment. Furthermore, in order to improve cutting properties of a glass, Japanese Patent No. 4289927 describes a method for keeping a glass at a temperature higher than a temperature of a first dipping treatment after ion-exchanging.

Moreover, JP-A-54-83923 describes an ion-exchange strengthening method comprising forming a surface compressive stress layer on a glass surface layer by an ion-exchange treatment, subjecting the glass to a heat treatment at a temperature of 480 to 600° C. to move the compressive stress layer to the inner part of the glass from the glass surface, and then ion-exchanging the glass to form the compressive stress layer on the glass surface layer.

SUMMARY OF THE INVENTION

Problems that the Invention is to Solve

A flat panel display device is portable. It is therefore considered that breakage of a cover glass mainly occurs in the case that stone or the like hits to a glass surface when the device has dropped, and the breakage occurs starting from crack generated by press fit, as the origin. That is, high durability to press fit rather than bending strength is required in the strength of a cover glass.

In fact, when shock is imparted to a cover glass in such a case where users erroneously have dropped a flat panel display device, even though the cover glass is a chemical strengthened glass, slow crack in which a glass cracks at relatively slow speed from a scratch penetrating a compressive stress layer as an origin sometimes occurs (hereinafter, such a cracking manner of a glass is called as “slow cracking”).

As compared with so-called edge cracking or spider cracking described hereinafter, the slow cracking remarkably differs from the conventionally problematic cracking in that the slow cracking occurs by lower load or drop from lower place.

The slow cracking occurs in a region in which the origin of destruction exceeded a compressive stress layer (depth of scratch is typically several tens to several hundreds micrometers, and a compressive stress layer by chemical strengthening is several to several tens micrometers). Therefore, it is necessary to develop a cover glass having strong mechanical characteristics to slow cracking.

In order to prevent a glass from breaking into pieces when scratch has been generated in a position deeper than a compressive stress layer, a cover glass having excellent strength to abrasion (hereinafter referred to “abraded strength”) together with strong mechanical characteristic to slow cracking is required.

The present inventors have found that slow crack is liable to occur when compressive stress is increased and depth of a compressive stress layer is increased, as described in JP-A-2008-115071 and JP-A-2002-174810.

On the other hand, the methods described in Japanese Patent No. 4289931 and Japanese Patent No. 4289927 can deepen depth of a compressive stress layer, but surface compressive stress is decreased. Therefore, there is a problem that abraded strength is decreased. Furthermore, in the method described in JP-A-54-83923, the temperature of heat treatment is higher than a glass transition temperature of a glass used in a cover glass, and a glass relaxes by the heat treatment. Therefore, the method was not sufficient in the prevention of stress relaxation.

Accordingly, the present invention provides a cover glass for a display, having high durability of slow cracking and strong abraded strength even though compressive stress is large and depth of a compressive stress layer is deep.

Means for Solving the Problems

Namely, the present invention is as follows.

1. A cover glass for a display, wherein a depth of a compressive stress layer (DOL) is 30 μm or more, a surface compressive stress is 300 MPa or more, a position (HW) at which a compressive stress is half of a value of the surface compressive stress is a position of 8 μm or more from a glass surface, and the depth of the compressive stress layer (DOL) and the position (HW) at which the compressive stress is half of the value of the surface compressive stress satisfy the following formula:

$$0.05 \leq HW/DOL \leq 0.23 \quad (1).$$

2. A cover glass for a tablet PC with a touch sensor function, having a compressive stress layer in which a surface compressive stress is 300 MPa or more and a depth of the compressive stress layer (DOL) is 15 μm or more, and having a thickness of less than 0.8 mm, a size of 150 to 350 mm×100 to 250 mm and a mass of 150 to 1,000 g, wherein the surface compressive stress (CS)× the depth of the compressive stress layer (DOL) is 35 MPa·mm or less.

3. A method for manufacturing a cover glass for a display, the cover glass having a depth of a compressive stress layer of 30 μm or more and a surface compressive stress of 300 MPa or more, the method sequentially including the following steps (1) to (3):

(1) a first chemical strengthening step of forming a compressive stress layer on a glass surface by subjecting a glass to an ion-exchange treatment;

(2) a heating step of heat-treating the glass at a temperature 50° C. or more lower than a glass transition temperature; and (3) a second chemical strengthening step of further forming a compressive stress layer on the glass surface by subjecting the glass to an ion-exchange treatment.

4. The method for manufacturing a cover glass for a display according to item 3, wherein the ion-exchange treatments in steps (1) and (3) are a treatment at a temperature 50° C. or more lower than the glass transition temperature.

5. The method for manufacturing a cover glass for a display according to item 3 or 4, wherein the depth of the compressive stress layer (DOL) and a position (HW) at which a compressive stress is half of a value of the surface compressive stress, of the cover glass for a display obtained satisfy the following formula (1), and the position (HW) at which the compressive stress is half of the value of the surface compressive stress is a position of 8 μm or more from the glass surface:

$$0.05 \leq HW/DOL \leq 0.23 \quad (1)$$

Advantage of the Invention

The cover glass for a display of the present invention has high surface compressive stress, shows high durability to slow cracking even in the case where depth of a compressive stress layer is deep, and has excellent abraded strength.

In other words, the cover glass for a display of the present invention is a glass strong to slow cracking and abraded strength.

BRIEF DESCRIPTION OF THE DRAWINGS

FIG. 2A is a view showing the origin of destruction, and FIG. 2B is a view showing crack.

FIG. 9A is a view showing the origin of destruction, and FIG. 9B is a view showing a crack.

FIG. 11A is a view showing an enlarged photograph of sandpaper P30, FIG. 11B is a view showing an enlarged photograph of asphalt/concrete, and FIG. 11C is a graph showing an angle distribution of a tip of sandpaper P30 and an angle distribution of a tip of sand.

DESCRIPTION OF THE EMBODIMENTS

1. Slow Cracking

The cover glass for a display of the present invention shows high durability to slow cracking. The mechanism of slow cracking is described by reference to slow cracking that occurs when a flat panel display device was dropped, as a specific example.

Figure 1:
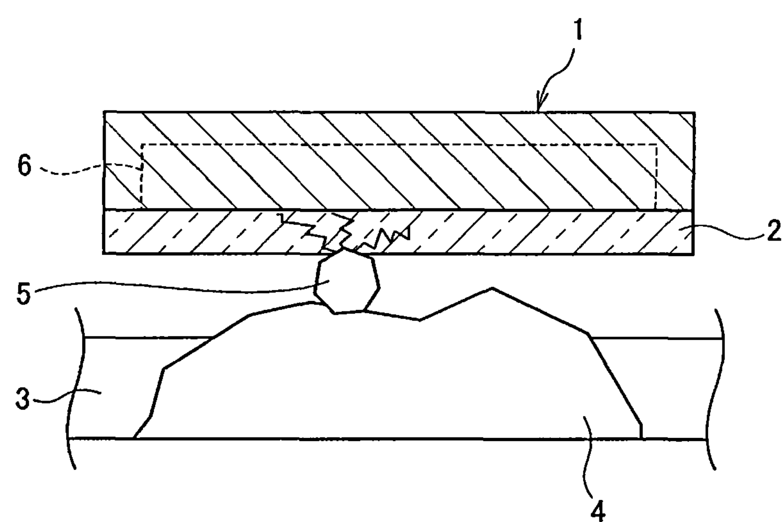
FIG. 1 is a schematic view showing the situation that slow cracking occurs in a cover glass when a flat panel display device dropped.
Figure 2A:
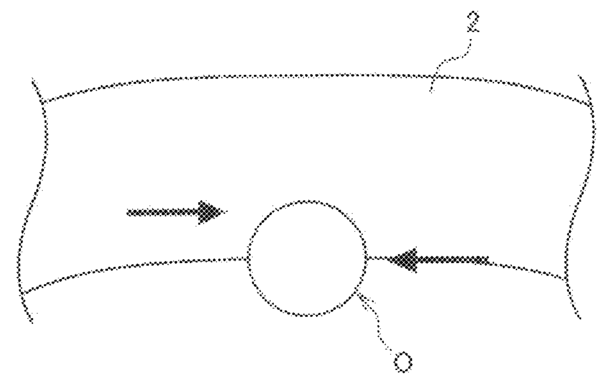
FIGS. 2A-2B are views schematically showing the mechanism that slow cracking occurs.
Figure 2B:
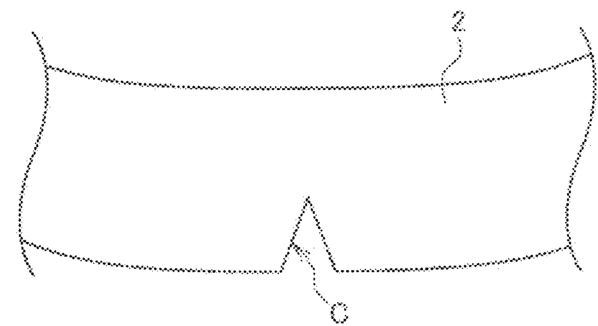
Figure 3A:
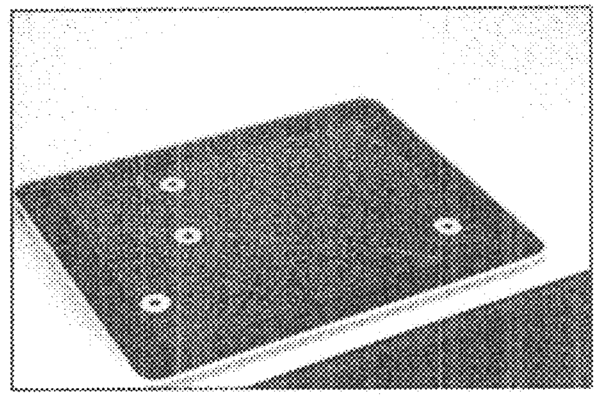
FIG. 3A is a view showing a photograph of a tablet PC with touch sensor function in which slow cracking occurred.
Figure 3B:
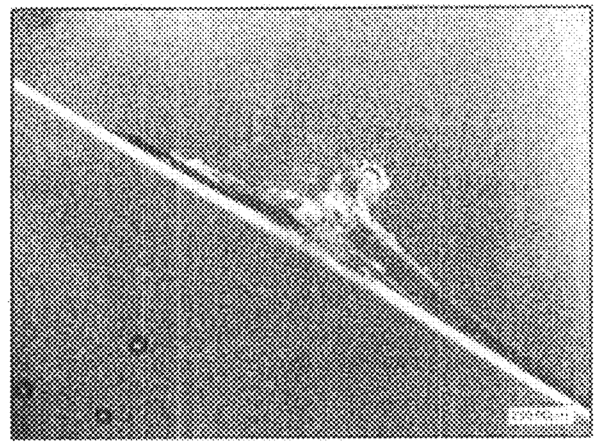
FIG. 3B is a view showing an enlarged photograph in which the origin of destruction was seen from above.

FIG. 1 is a schematic view showing the situation that slow cracking occurs in a cover glass when a flat panel display device was dropped, and FIGS. 2A-2B are views schematically showing the mechanism that slow cracking occurs. FIG. 3A is a view showing a photograph of a tablet PC with a touch sensor function in which slow cracking occurred, FIG. 3B is a view showing an enlarged photograph in which the origin of destruction was seen from above, and FIG. 3C is a view showing a photograph in which the origin of destruction was seen from side.

In a flat panel display device, a nearly rectangular frame is provided so as to surround an image display part, and a cover glass is supported on the frame. As shown in FIG. 1, when a tablet PC 1 with a touch sensor function drops on the ground (asphalt/concrete or the like) and is brought into contact with a sand 5 or the like on a pebble 4 in asphalt/concrete 3 in the state that a cover glass 2 looks down, compressive stress acts to the origin O of destruction, and tensile stress acts on the side of an image display part of a cover glass [FIG. 2A]. Subsequently, tensile stress acts on the origin of destruction O, a crack C expands, and the cover glass 2 breaks [FIG. 2B].

The origin of destruction sometimes occurs in the central part of a cover glass. However, since only deflection of a cover glass is constrained by a frame and stress generated in the origin of destruction is increased, the origin of destruction occurs in a part of a region supported by the frame in many cases. The cracking of the cover glass 2 occurs even on a floor surface of a meeting room, a living room, a kitchen and the like, not limited to the case of dropping on the ground.

Figure 3C:
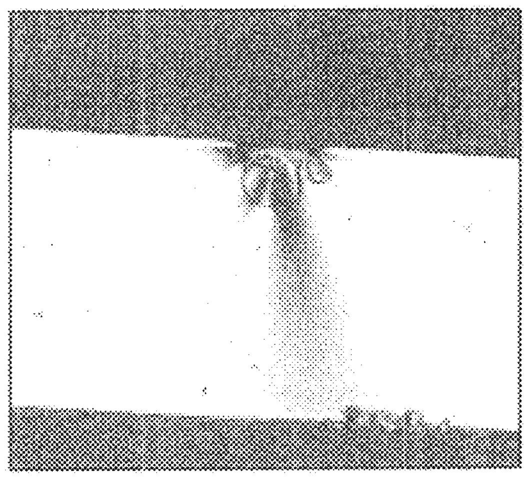
FIG. 3C is a view showing a photograph in which the origin of destruction was seen from side.

In the crack of the cover glass 2 in this case, a scratch deeper than the depth of a compressive stress layer becomes the origin of destruction as is apparent from the fracture surface shown in FIG. 3C. In FIG. 3A and FIG. 3B, one crack extends from the origin of destruction, and the cover glass breaks into two pieces. Further observing the fracture surface shown in FIG. 3C, a mirror surface (mirror) having long mirror surface radius (mirror radius), smooth like a mirror, is observed around the origin of destruction deeper than the depth of the compressive stress layer.

Figure 4:
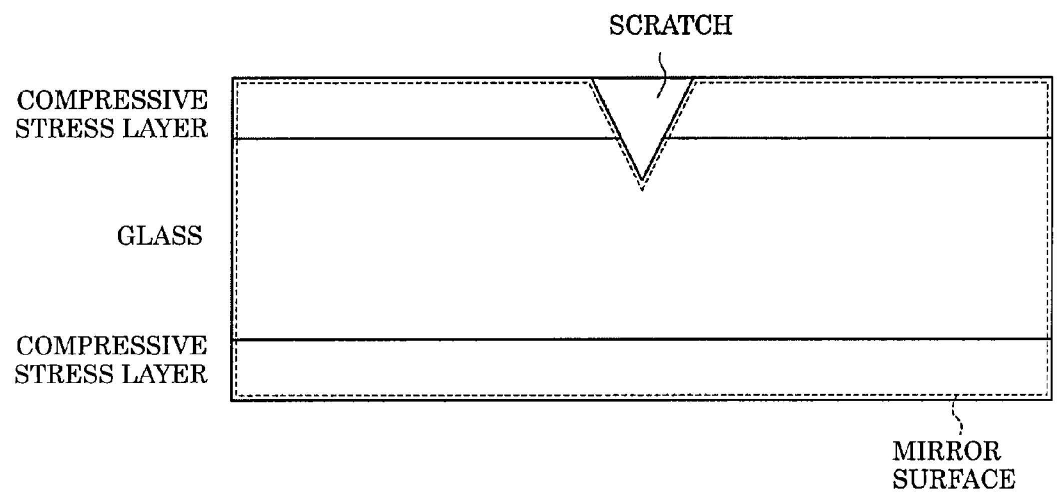
FIG. 4 is a view schematically showing the fracture surface of FIG. 3C.

FIG. 4 is a view schematically showing the fracture surface of FIG. 3C. The fracture surface reflects the process of destruction, that is, factors such as the origin of destruction, the direction of destruction, and whether destruction proceeds mildly or proceeds rapidly. According to the analysis of the fracture surface of the slow cracking, a mirror surface having long mirror surface radius means that the destruction proceeds by small stress, and such a smooth fracture surface means that crack grew slowly in a far slow speed as compared with sound velocity.

Therefore, according to the fracture surface of FIG. 3C, it is seen that after the origin deeper than the depth of the compressive stress layer has been formed in a cover glass, crack gradually grows, and destruction proceeds by small stress. In the cover glass broken by the slow cracking, broken pieces are several pieces and in some cases, several tens pieces.

Typically, the cover glass breaks into 2 to 20 pieces, and the example in which one crack extends from the origin of destruction shown in FIGS. 3A and 3B and the cover glass breaks into two pieces is a symbolic example of slow cracking.

Whether or not it is slow cracking is microscopically judged as follows. First of all, it does not say to be slow cracking unless the origin of destruction is observed. In the case where the vicinity of the origin of destruction is observed and a scratch penetrating a compressive stress layer, that is, a scratch deeper than the depth of the compressive stress layer (so-called DOL), is confirmed as the origin of destruction, it is slow cracking. In the case where a mirror surface radius is long, the fracture surface is a mirror surface, and mist or hackle is not observed, it is slow cracking.

Figure 5:
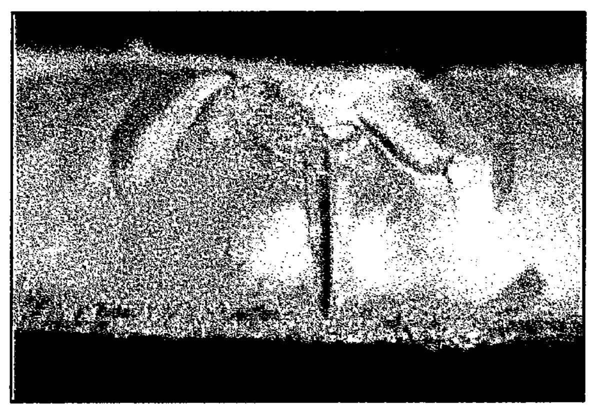
FIG. 5 is a view showing a photograph in which the origin of destruction of a cover glass in which non-slow cracking occurred was seen from side.
Figure 6:
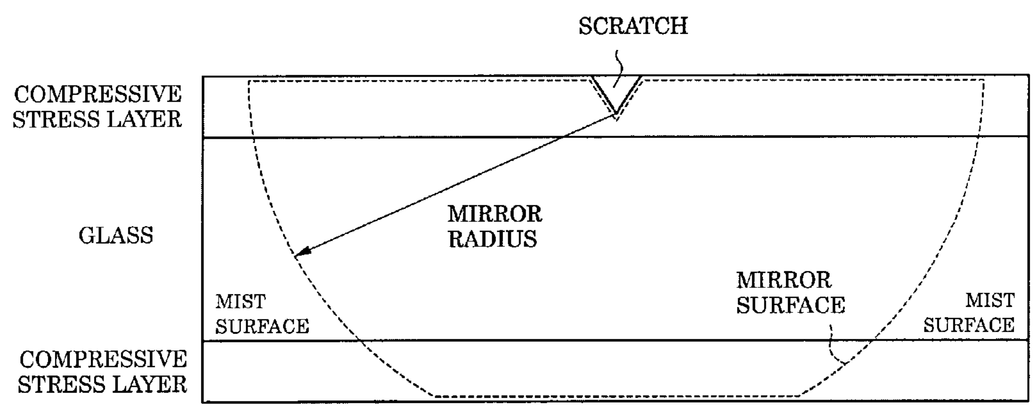
FIG. 6 is a view schematically showing the fracture surface of FIG. 5.

For the sake of comparison with slow cracking, a cracking manner of a cover glass that is not slow cracking (hereinafter referred to as "non-slow cracking") is described. The cracking of a cover glass occurred by pushing a knoop indenter on a glass surface is described as the non-slow cracking. FIG. 5 is a view showing a photograph in which the origin of destruction of a cover glass by non-slow cracking was seen from side, and FIG. 6 is a view schematically showing the fracture surface of FIG. 5.

When observing the fracture surface of the non-slow cracking, the origin of destruction is formed in a compressive stress layer, a mirror surface having short mirror surface radius, that is smooth like a mirror is observed around the origin of destruction, and mist surface (mist) is present around the mirror surface. According to the analysis of fracture surface of the non-slow cracking, the mirror surface having short mirror surface radius means that the destruction proceeded by large stress, and the mist surface means that crack rapidly grew.

Figure 7:
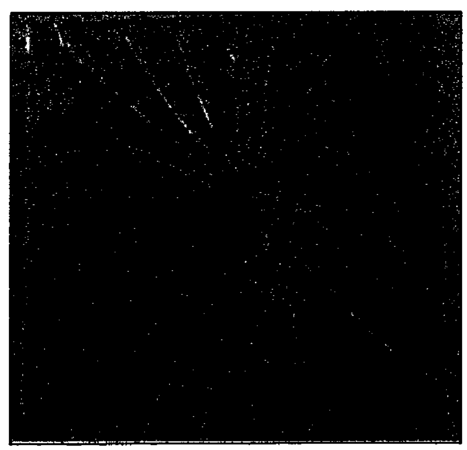
FIG. 7 is a view showing a photograph of a cover glass in which spider cracking occurred.

Therefore, according to the fracture surface of FIG. 5, it is seen that after the origin of destruction deeper than the depth of the compressive stress layer was formed in the cover glass, destruction proceeded by large stress, and crack rapidly grew. When the non-slow cracking occurs, as shown in FIG. 7, a cover glass is broken into a plurality (20 pieces or more) of glass pieces by a plurality of cracks extended in spider web shape (this cracking manner is hereinafter referred to as spider cracking). Thus, it is seen that destruction occurs in a quite different mode between the slow cracking and the non-slow cracking.

In the non-slow cracking, the origin of destruction occurs in the compressive stress layer. In order to prevent the occurrence, it is effective to increase the surface compressive stress or to deepen the compressive stress layer. On the other hand, in the slow cracking, the origin of destruction occurs in a region exceeding the compressive stress layer, that is, a tensile stress layer (the depth of scratch is typically several tens to several hundreds micrometers, and the compressive stress layer by chemical strengthening is several to several tens micrometers). Therefore, in a cover glass for a tablet PC with a touch sensor function, in which slow cracking is liable to occur, it is necessary to select a cover glass having mechanical characteristics strong to slow cracking.

In view of the above, the present inventors have found a sandpaper falling ball test described hereinafter as a method for reproducing the slow cracking. The threshold is obtained from the sandpaper falling ball test, and a cover glass having a threshold higher than the threshold obtained is used as a cover glass for a tablet PC with a touch sensor function. This made it possible to provide a cover glass for a tablet PC with a touch sensor function, strong to slow cracking while decreasing the thickness of a glass.

Figure 8:
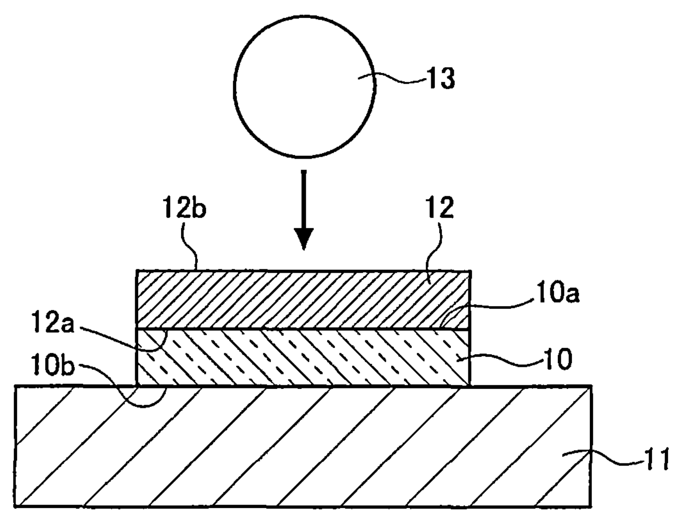
FIG. 8 is a schematic view of a reproduction method of slow cracking.

The sandpaper falling ball test is conducted in the following manner. As shown in FIG. 8, a chemical strengthened glass 10 having a compressive stress layer formed on the surface thereof is arranged on a table 11, the chemical strengthened glass 10 is brought into contact with a rubbing surface 12*a* of a sandpaper 12 containing an abrasive material having a size larger than the depth of the compressive stress layer, and a sphere 13 such as an iron ball is fallen from above.

In this case, the sandpaper 10 is preferably arranged above the chemical strengthened glass 10, an upper surface 10*a* of the chemical strengthened glass 10 is brought into contact with the rubbing surface 12*a* of the sandpaper 12, and the sphere 13 falls on a surface 12*b* opposite the rubbing surface 12*a* of the sandpaper 12.

The table 11 is preferably formed from a hard stone such as granite. This can eliminate a place of refuge of stress as same as in a region of a cover glass supported by a frame in which scratch becoming the origin of destruction is liable to occur. However, a material of the table 11 can alter elastic modulus or deflection according to the purpose, and a straight material, a glass, a frame having hollowed central part, and the like can be appropriately selected.

The sandpaper in the present invention is not limited to an abrasive paper (sandpaper, JIS R6252: 2006), and includes a product comprising a base material having an abrasive coated thereon with an adhesive, or a product corresponding the same, and includes, for example, an abrasive cloth (JIS R6251: 2006) and a water-resistant abrasive paper (JIS R6253: 2006).

P12 to P2500 are present in the sandpaper 12 depending on a particle size of an abrasive contained therein (JIS R6252: 2006). The abrasive is typically alumina and silicon carbide. Assuming that a particle size of sand contained in asphalt/concrete is 0.06 mm to 1 mm, P30 to P600 correspond to those as a particle size of the abrasive containing in the sandpaper 12.

For example, assuming that the depth of a compressive stress layer is 30 μm, sandpapers such as P30 ($D_3$: 710 μm), P100 ($D_3$: 180 μm), P320 ($d_3$: 66.8 μm) and P600 ($d_3$: 43.0 μm) are selected as the sandpaper containing an abrasive larger than the depth of the compressive stress layer.

Material and weight of the sphere 13 can be changed depending on the purpose. Typically, a stainless steel ball having a weight of 4 to 150 g is used.

When the sphere 13 has been dropped on the chemical strengthened glass 10 arranged on the table 11, the origin O of destruction occurs in a part of the chemical strengthened glass 10 deeper than the compressive stress layer at an upper surface 10*a* side by a polishing material contained in the sandpaper 12.

Figure 9A:
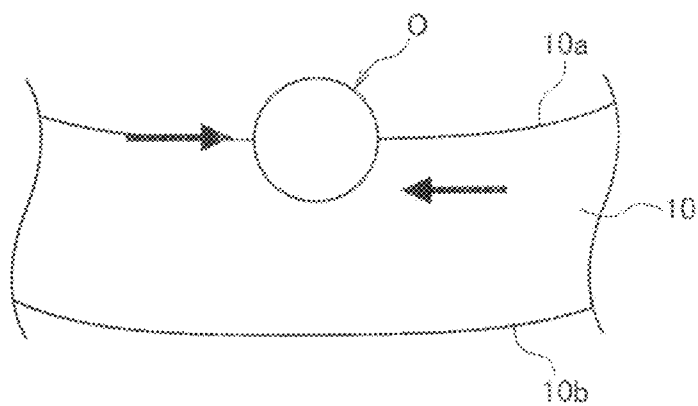
FIGS. 9A-9B are views schematically showing the mechanism that cracking of a chemical strengthened glass occurs in the reproduction method of slow cracking in FIG. 8.
Figure 9B:
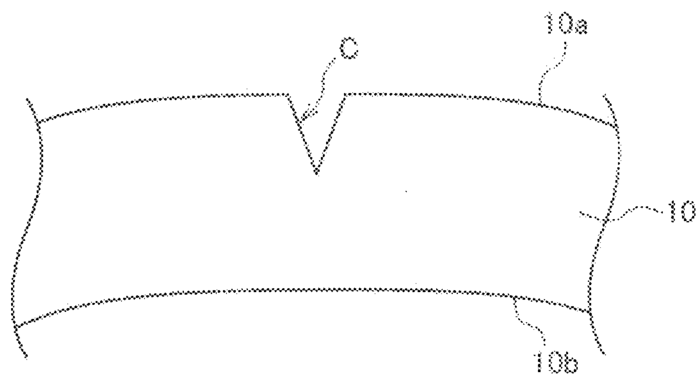

In this case, compressive stress acts on the origin O of destruction, and tensile stress acts on the circumference thereof [FIG. 9A]. Subsequently, tensile stress acts on the origin O of destruction, crack C extends, and the cover glass breaks [FIG. 9B]. That is, although there is the difference as to whether the surface of the origin of destruction is an upper surface or a lower surface, cracking occurs in the same mechanism as the slow cracking described in FIGS. 2A and 2B.

Figures 10A, 10B:
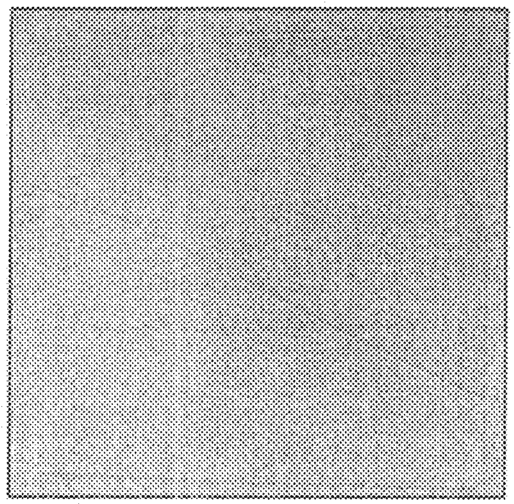
FIG. 10A is a view showing a photograph of a cover glass in which slow cracking occurred by arranging a chemical strengthened glass on a granite table, dropping a steel sphere having a diameter of 0.75 inch and a weight of 4 g on the table from a height of 17 mm in the state that an upper surface of the chemical strengthened glass was brought into contact with a rubbing surface of sandpaper P30.
FIG. 10B is a view showing a photograph in which the origin of destruction was seen from side.

FIG. 10A is a view showing the photograph of the cover glass in which slow cracking occurred by arranging the chemical strengthened glass 10 on a granite table, dropping the stainless steel sphere 13 having a diameter of 0.75 inch and a weight of 4 g from a height of 17 mm in the state that the upper surface of the chemical strengthened glass 10 was brought into contact with the rubbing surface of sandpaper 12 of P30. FIG. 10B is a view showing the photograph in which the origin of destruction of FIG. 10A was seen from the side.

The chemical strengthened glass is that one crack extends and the cover glass is broken into two pieces. FIG. 10B shows the same fracture surface as in FIG. 3C, and it is seen that the cracking occurs in the same mechanism as the slow cracking.

FIG. 11A is an enlarged photograph of sandpaper P30, FIG. 11B is an enlarged photograph of asphalt/concrete (collected in Yokohama), and FIG. 11C is a graph showing an angle distribution of a tip of sandpaper P30 and an angle distribution of a tip of sand.

FIG. 11C is a graph in which 144 places of sandpaper and sands on 149 places were observed, the tip angle of the sandpaper or sand was shown in a vertical axis, and the frequency was shown in a horizontal axis. In the present invention, sandpaper P30 is selected from the similarity in shape between alumina as an abrasive contained in the sandpaper P30 and small stones contained in asphalt/concrete.

2. Cover Glass for Display

In the cover glass for a display of the present invention, a depth of a compressive stress layer (DOL) is 30 μm or more, preferably 40 μm or more, and still more preferably 50 μm or more. In the case where the depth of the compressive stress layer is less than 30 μm, when scratch of a glass is deep, a glass is liable to break. The depth of the compressive stress layer is measured by the method described in examples described hereinafter.

In the cover glass for a display of the present invention, the surface compressive stress (CS) is 300 MPa or more, preferably 350 MPa or more, and still more preferably 400 MPa or more. In the case where the surface compressive stress is less than 300 MPa, sufficient strength required in the cover glass for a display cannot be maintained. The surface compressive stress is measured by the method described in examples described hereinafter.

In the cover glass for a display of the present invention, the position (HW) at which compressive stress is half of the value of the surface compressive stress is a position of 8 μm or more, preferably a position of 10 μm or more, and still more preferably a position of 12 μm or more, from the glass surface. In the case where the position (HW) at which compressive stress is half of the value of the surface compressive stress is a position of less than 8 μm from the glass surface, strength to scratch is insufficient. The position at which compressive stress is half of the value of the surface compressive stress is measured by the method described in examples described hereinafter.

In the cover glass for a display of the present invention, the depth of the compressive stress layer (DOL) and the position (HW) at which compressive stress is half of the value of the surface compressive stress satisfy the following formula (1):

$$0.05 \leq HW/DOL \leq 0.23 \quad (1)$$

Figure 12:
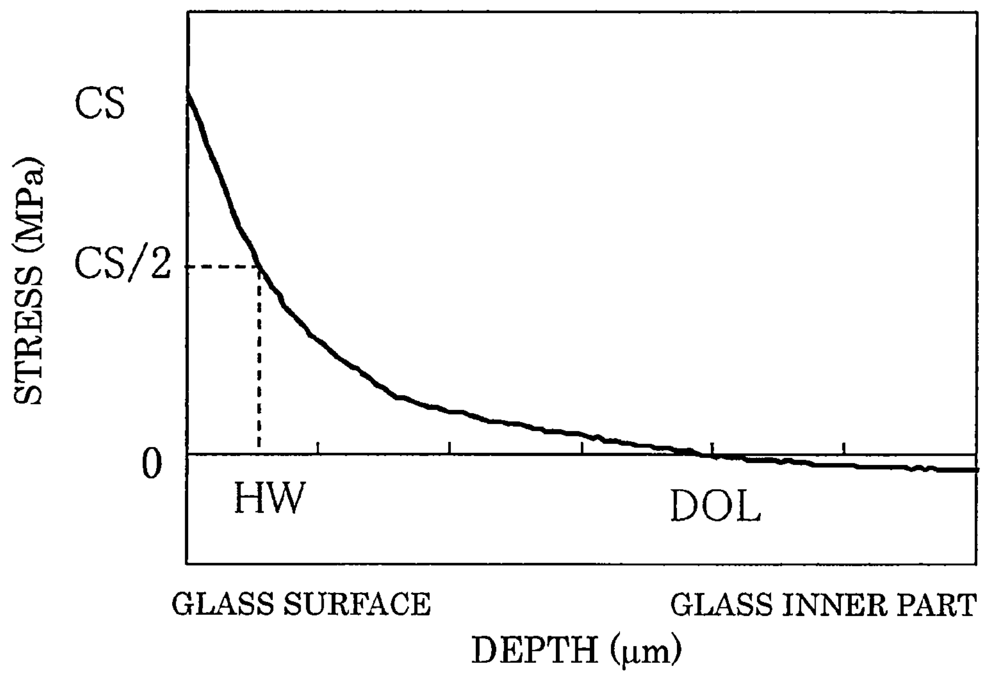
FIG. 12 shows the relationship of surface compressive stress (CS), depth of a compressive stress layer (DOL) and a position (HW) at which the compressive stress is half of the value of the surface compressive stress. The horizontal axis shows a distance of from a glass surface toward the inner part of a glass, and the vertical axis shows a stress value when the compressive stress is positive.

The relationship of the surface compressive stress (CS), the depth of the compressive stress layer (DOL) and the position (HW) at which compressive stress is half of the value of the surface compressive stress is described by reference to FIG. 12. The horizontal axis of the graph shown in FIG. 12 indicates a distance toward the inner part of a glass from the glass surface, and the vertical axis is a stress value when compressive stress is positive. Negative value indicates tensile stress.

The surface compressive stress (CS) is compressive stress on the glass surface, and the value is 300 MPa or more. The depth of the compressive stress layer (DOL) indicates a region in which stress is compression from the glass surface, that is, a depth at which a stress value changes from a positive value to a negative value in FIG. 12. The position (HW) at which compressive stress is half of the value of the surface compressive stress indicates a depth in the inner part of a glass, at which a stress value is half of the value of the surface compressive stress.

Figure 13:
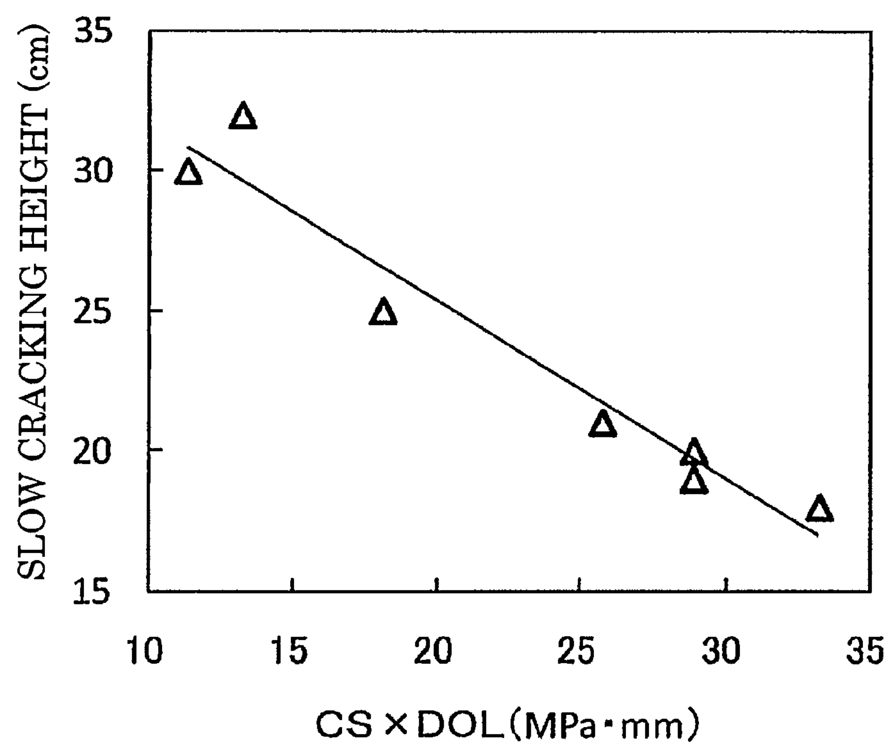
FIG. 13 shows the relationship of surface compressive stress (CS), depth of a compressive stress layer (DOL) and slow cracking height.

Durability to scratch becomes insufficient as HW/DOL is decreased, resulting in decrease in abraded strength. FIG. 13 is the relationship of the surface compressive stress (CS), the depth of the compressive stress layer (DOL) and the slow cracking height in the case of having stress distribution according to Fick's law, and when the depth of the compressive stress layer (DOL) is increased and the surface compressive stress (CS) is increased, the slow cracking height is decreased. From this fact, the durability to the slow cracking height is decreased as the HW/DOL is increased.

The formula (1) indicates a profile that increases durability to slow cracking height of a cover glass and obtains sufficient abraded strength. In the formula (1), the HW/DOL is 0.05 or more, preferably 0.08 or more, and still more preferably 0.1 or more.

In the case where the HW/DOL is less than 0.05, abraded strength becomes insufficient, and there is a concern that a glass breaks when scratch is generated in a glass at a position deeper than the compressive stress layer. The abraded strength can be evaluated by a three-point bending test described in examples described hereinafter.

In the formula (1), the HW/DOL is 0.23 or less, and preferably 0.21 or less. In the case where the HW/DOL exceeds 0.23, slow cracking is liable to occur.

A method for setting the HW/DOL of a cover glass for a display to a range of 0.05 to 0.23 includes a method of treating a glass with a method sequentially including the following steps (1) to (3), and additionally setting the depth of the compressive stress layer to 30 μm or more and the surface compressive stress to 300 MPa or more:

(1) a first chemical strengthening step of forming a compressive stress layer on the glass surface by subjecting a glass to an ion-exchange treatment;

(2) a heat treatment step of heat-treating a glass at a temperature 50° C. or more lower than a glass transition point; and (3) a second chemical strengthening step of further forming a compressive stress layer on the glass surface by subjecting the glass to an ion-exchange treatment.

The cover glass for a display of the present invention has a thickness of preferably 1.2 mm or less, more preferably 1.0 mm or less, still more preferably 0.8 mm or less, and particularly preferably 0.6 mm or less.

The cover glass for a display of the present invention particularly can suppress the occurrence of slow cracking typically observed in a cover glass for a tablet PC with a touch sensor function, and can obtain larger effect. However, the cover glass is not limited to this, and may be used in flat panel display devices of PDP (Plasma Display Panel), LCD (Liquid Crystal Display), mobile phones, personal digital assistants, desktop PC or laptop PC, and the like.

3. Cover Glass for Tablet PC with Touch Sensor Function

A tablet PC with a touch sensor function is used by standing in many cases. It is reported that when shock in such an extent that a cover glass does not break is applied to the cover glass, that is, in the case where users erroneously bring a tablet PC with a touch sensor function down, cracking occurs even though the cover glass is a chemical strengthened glass. It is considered that the cracking is slow cracking.

The slow cracking has not conventionally been problematic, and it is required that the slow cracking is further difficult to occur. Furthermore, since the tablet PC with a touch sensor function has a large size as compared with mobile phones or personal digital assistants, it is required to further decrease the thickness of a glass for the purpose of reduction in weight. In fact, a glass having a thickness of 0.6 mm is used as the cover glass. As a result, slow cracking becomes a remarkable problem in the tablet PC with a tough sensor function.

The reason that slow cracking becomes a remarkable problem in the tablet PC with a tough sensor function is as follows. For example, since PDP, LCD, desktop PC or laptop PC is used on a television table or a desk, the possibility of contacting with a material that generates scratch penetrating a compressive stress layer is low, and furthermore, the possibility that shock in the extent that slow cracking occurs in a cover glass is given is small. For this reason, the slow cracking is relatively difficult to occur.

On the other hand, mobile phones, personal digital assistants and the like are carried by users. Therefore, the possibility of contacting with a material that generates scratch penetrating a compressive stress layer is high, and also the possibility that shock is given by drop or the like is high.

However, mobile phones, personal digital assistants and the like have small size, and are dropped from a high place in many cases. Therefore, in the case where those are erroneously dropped, the occurrence of shock cracking generated from the edge as the origin (typically, a glass breaks to pieces) is dominant. For this reason, the slow cracking is relatively difficult to occur in mobile phones, personal digital assistants and the like.

In contract to this, the tablet PC with a touch sensor function has a size of 150 to 350 mm×100 to 250 mm, and a weight of 150 to 1,000 g. Although the tablet PC has large size and heavy weight as compared with mobile phones, personal digital assistants and the like, users carry the tablet PC.

The size means an area of a display surface, and the size of 150 to 350 mm×100 to 250 mm means that the height or one side is 150 to 350 mm and the width or the other side is 100 to 250 mm.

As the example of use method, for example, users vertically set a tablet PC with a touch sensor function in a kitchen, and do cooking while seeing a recipe, or users vertically set a tablet PC with a touch sensor function in a conference room, and conduct a meeting while seeing information materials.

Therefore, in the case where users have erroneously dropped or fallen down the tablet PC with a touch sensor function, the cover glass for a tablet PC with a touch sensor function has large area of a glass as compared with mobile phones and personal digital assistants. Therefore, the possibility of contacting with the origin of destruction is high, internal tensile stress during chemical strengthening is high due to small thickness of a glass, and a product is heavy. Therefore, even in the case of dropping from relatively low place, such as from a knee, shock energy generated in such a case becomes high. As a result, scratch penetrating a surface compressive stress layer is liable to be generated, and slow cracking is liable to occur.

As shown in FIG. 13, when the depth of the compressive stress layer (DOL) is increased and the surface compressive stress (CS) is increased, slow cracking height is decreased. Therefore, when the compressive stress is decreased and the depth of the surface compressive stress is decreased, durability to slow cracking of the tablet PC with a touch sensor function can be increased.

More specifically, when the value of the product (DOL×CS) of the surface compressive stress and the depth of the compressive stress layer is 35 MPa·mm or less, preferably 30 MPa·mm or less, and more preferably 25 MPa·mm or less, the tablet PC with a touch sensor function having high durability to slow cracking is obtained.

Method for setting the value of the product (DOL×CS) of the surface compressive stress and the depth of the compressive stress layer to 35 MPa·mm or less includes a method of adjusting a treatment temperature and a treatment time of an ion-exchange treatment, a method of adjusting a molten salt, and a method of adjusting a glass composition.

In the cover glass for a tablet PC with a touch sensor function of the present invention, in order to enhance scratch resistance, the depth of the compressive stress layer when chemical strengthening has been conducted is 15 μm or more, preferably 20 μm or more, and more preferably 30 μm or more. The surface compressive stress is 300 MPa or more, preferably 400 MPa or more, and more preferably 500 MPa or more.

4. Method for Manufacturing Cover Glass for Display

In the method for manufacturing a cover glass for a display of the present invention, steps other than a chemical strengthening step are not particularly limited, and are appropriately selected. Typically, the conventional steps can be applied.

For example, raw materials of each component are mixed so as to be a composition described hereinafter, and the resulting mixture is melted in a glass melting furnace. The resulting glass is homogenized by bubbling, stirring, addition of a refining agent, and the like, and then formed into a glass sheet having a prescribed thickness by the conventional forming method, followed by annealing.

Examples of the method for forming a glass include a float process, a pressing process, a fusion process and a downdraw process. A float process suitable for mass production is particularly preferred. Continuous forming methods other than a float process, that is, a fusion process and a downdraw process, are also preferred.

The glass formed is ground and polished, if necessary, and then subjected to chemical strengthening treatment, followed by cleaning and drying.

(Composition of Glass)

A glass containing alkali ions having small ionic radius (for example, alkali metal ions having an ionic radius smaller than that of potassium, or alkali metal ions having an ionic radius smaller than that of sodium) is used as the glass to be subjected to chemical strengthening treatment. The composition of the glass preferably contains $SiO_2$, $Al_2O_3$, $Na_2O$ and MgO, or $SiO_2$, $Al_2O_3$, $Li_2O$ and MgO, from the standpoints that surface compressive stress can be sufficiently imparted and the thickness of the compressive stress layer can be formed in a short period of time.

$SiO_2$ is an essential component which forms a glass network.

$Na_2O$ is a component which chemically strengthens a glass by substituting with mainly potassium ions in an ion-exchange treatment, and additionally controls a thermal expansion coefficient and increases meltability and formability of a glass by decreasing a viscosity of the glass at high temperature.

$Li_2O$ is a component which chemically strengthens a glass by mainly substituting with sodium ions in an ion-exchange treatment, and additionally controls a thermal expansion coefficient and increases meltability and formability by decreasing a viscosity of the glass at high temperature.

$Al_2O_3$ is a component which has the effect of increasing Tg, weather resistance and Young's modulus, and further improves ion exchangeability of a glass surface.

MgO is a component which makes a glass difficult to be scratched, and improves meltability of a glass.

$ZrO_2$ is a component which improves ion exchange rate and improves chemical durability and hardness of a glass, and in some cases, is preferably contained.

For example, a glass having the following composition is used as the glass to be subjected to chemical strengthening treatment.

(i) A glass containing 50 to 80% of $SiO_2$, 2 to 25% of $Al_2O_3$, 0 to 10% of $Li_2O$, 0 to 18% of $Na_2O$, 0 to 10% of $K_2O$, 0 to 15% of MgO, 0 to 5% of CaO and 0 to 5% of $ZrO_2$ in terms of mol %.

(ii) A glass containing 50 to 74% of $SiO_2$, 1 to 10% of $Al_2O_3$, 6 to 14% of $Na_2O$, 3 to 11% of $K_2O$, 2 to 15% of MgO, 0 to 6% of CaO and 0 to 5% of $ZrO_2$ in terms of mol %, wherein the total content of $SiO_2$ and $Al_2O_3$ is 75% or less, the total content of $Na_2O$ and $K_2O$ is 12 to 25%, and the total content of MgO and CaO is 7 to 15%.

(iii) A glass containing 68 to 80% of $SiO_2$, 4 to 10% of $Al_2O_3$, 5 to 15% of $Na_2O$, 0 to 1% of $K_2O$, 4 to 15% of MgO and 0 to 1% of $ZrO_2$ in terms of mol %.

(iv) A glass containing 67 to 75% of $SiO_2$, 0 to 4% of $Al_2O_3$, 7 to 15% of $Na_2O$, 1 to 9% of $K_2O$, 6 to 14% of MgO and 0 to 1.5% of $ZrO_2$ in terms of mol %, wherein the total content of $SiO_2$ and $Al_2O_3$ is 71 to 75%, the total content of $Na_2O$ and $K_2O$ is 12 to 20%, and when containing CaO, the content thereof is less than 1%.

(v) A glass containing 60 to 75% of $SiO_2$, 5 to 15% of $Al_2O_3$, 0 to 12% of MgO, 0 to 3% of CaO, 0 to 3% of $ZrO_2$, 10 to 20% of $Li_2O$, 0 to 8% of $Na_2O$ and 0 to 5% of $K_2O$ in terms of mol %, wherein the total content $R_2O$ of $Li_2O$, $Na_2O$ and $K_2O$ is 25% or less, and a ratio $Li_2O/R_2O$ of $Li_2O$ content to $R_2O$ is 0.5 to 1.0.

(vi) A glass containing 61 to 72% of $SiO_2$, 8 to 17% of $Al_2O_3$, 6 to 18% of $Li_2O$, 2 to 15% of $Na_2O$, 0 to 8% of $K_2O$, 0 to 6% of MgO, 0 to 6% of CaO, 0 to 4% of $TiO_2$ and 0 to 2.5% of $ZrO_2$ in terms of mol %, wherein the total content $R_2O$ of $Li_2O$, $Na_2O$ and $K_2O$ is 15 to 25% or less, a ratio $Li_2O/R_2O$ of $Li_2O$ content to $R_2O$ is 0.35 to 0.8 and the total content of MgO and CaO is 0 to 9%.

(Chemical Strengthening Treatment)

The chemical strengthening treatment means a treatment of substituting alkali ions having small ionic radius (for example, sodium ion or lithium ion) on the surface of a glass with alkali ions having large ionic radius (for example, potassium ion or sodium ion). For example, the chemical strengthening treatment can be carried out by treating a glass containing sodium ion with a melting treatment salt containing potassium ion. Furthermore, the chemical strengthening treatment can be carried out by treating a glass containing lithium ion with a melting treatment salt containing sodium ion. By conducting the ion-exchange treatment, the composition of the compressive stress layer on the surface of a glass slightly differs from the composition before the ion-exchange treatment, but the composition of the deep layer section of a substrate is nearly the same as the composition before the ion-exchange treatment.

The method for manufacturing a cover glass for a display of the present invention subsequently includes the following steps (1) to (3). The cover glass for a display obtained by the manufacturing method of the present invention has a depth of a compressive stress layer of 30 μm or more and surface compressive stress of 300 MPa or more.

(1) First chemical strengthening step of forming a compressive stress layer on the glass surface by subjecting a glass to an ion-exchange treatment.

(2) Heat treatment step of heat-treating a glass at a temperature 50° C. or more lower than a glass transition point.

(3) Second chemical strengthening step of further forming a compressive stress layer on the glass surface by subjecting the glass to an ion-exchange treatment.

Each step is described below.

(1) First Chemical Strengthening Step of Forming a Compressive Stress Layer on the Glass Surface by Subjecting a Glass to an Ion-Exchange Treatment Step (1) is a step of bringing a glass to be subjected to the chemical strengthening treatment into contact with a molten salt (for example, potassium salt or sodium salt) containing alkali metal ions having an ionic radius larger than that of alkali metal ions (for example, sodium ion or lithium ion) contained in the glass in a temperature region not exceeding a transition temperature of the glass to perform ion exchange between the alkali metal ions in the glass and the alkali metal salts having an large ionic radius of the alkali metal salts, and generating compressive stress on the glass surface by the difference in occupation area of alkali metal ions to form a compressive stress layer.

The treatment temperature and treatment time for bringing a glass into contact with a molten salt containing alkali metal ions are appropriately adjusted depending on the composition of the glass and molten salt. The heating temperature of the molten salt generally is preferably 350° C. or higher, and more preferably 370° C. or higher. Furthermore, the heating temperature generally is preferably 500° C. or lower, and more preferably 450° C. or lower.

When the heating temperature of the molten salt is 350° C. or higher, it prevents that chemical strengthening is difficult to be achieved due to the decrease in ion-exchange rate. On the other hand, when the heating temperature is 500° C. or lower, decomposition and degradation of the molten salt can be suppressed.

The time of bringing a glass into contact with a molten salt generally is preferably 10 minutes or more, and more preferably 15 minutes or more, to impart sufficient compressive stress to a glass. In the ion exchange for a long period of time, productivity is decreased and compressive stress value is decreased by relaxation. Therefore, the contact time is preferably 12 hours or less, more preferably 8 hours or less, and still more preferably 2 hours or less.

(2) Heat Treatment Step of Heat-Treating a Glass at a Temperature 50° C. or More Lower than a Glass Transition Point Step (2) is a step of heat-treating the glass having a compressive stress layer on the glass surface obtained in the step (1) to move larger alkali ions, for example, potassium ion, present in the compressive stress layer on the surface to the inner part of the glass from the surface of the glass, thereby moving the compressive stress layer to the inner part of the glass from the surface of the glass.

When the compressive stress layer moves to the inner part of the glass from the surface of the glass, compressive stress of the glass surface is decreased, but the compressive stress layer of preferably 50 μm or more is formed on a layer of preferably 0 to 20 μm from the glass surface.

The heat treatment temperature of a glass is a temperature 50° C. or more, preferably 70° C. or more, and more preferably 100° C. or more, lower than the glass transition temperature. When the glass is heat-treated at a temperature 50° C. or more lower than the glass transition temperature, stress relaxation of a glass can be prevented.

The heat treatment time of a glass is appropriately adjusted by the heat treatment temperature, and generally is preferably 30 to 2,000 minutes, and more preferably 30 to 300 minutes.

(3) A Second Chemical Strengthening Step of Further Forming a Compressive Stress Layer on the Glass Surface by Subjecting the Glass to an Ion-Exchange Treatment Step (3) is a step of further forming a compressive stress layer on a glass surface by subjecting the glass obtained in the step (2) to ion-exchange. When ion-exchange is again conducted in the step (3), the compressive stress layer can be formed on the glass surface and in the inner part of the glass.

The ion-exchange treatment of the step (3) may be conducted in the same method as in the ion-exchange treatment in the step (1) described above, and may be other method. Furthermore, other molten salt may be used.

The steps (1) to (3) in the manufacturing method of the present invention may be sequentially conducted in continuous steps, for example, on-line to a glass ribbon continuously moving in a glass sheet manufacturing step, and may be conducted in on-line non-continuously.

The molten salt for conducting an ion-exchange treatment preferably uses a treatment salt containing at least potassium salt or sodium salt. Examples of the treatment salt preferably used include potassium nitrate and sodium nitrate. Unless otherwise indicated, the content of each component is mass percentage.

The mixed molten salt may contain other components. Examples of the other components include alkali sulfates such as sodium sulfate and potassium sulfate, and alkali chlorides such as sodium chloride and potassium chloride.

The cover glass for a display having a depth of a compressive stress layer of 30 μm or more and surface compressive stress of 300 MPa or more obtained by the manufacturing method of the present invention sequentially including the above steps (1) to (3) preferably satisfies the above formula (1).

Examples

The present invention is described below by reference to examples, but it should be understood that the invention is not construed as being limited thereto.

(Evaluation Method)

(1) Surface Compressive Stress (CS) and Depth of Compressive Stress Layer (DOL)

Surface compressive stress (CS) and a depth of a compressive stress layer (DOL) were measured using a glass surface stress meter (FSM-6000LE) manufactured by Orihara Manufacturing Co., Ltd.

(2) Surface Compressive Stress (CS), Depth of Compressive Stress Layer (DOL) and Tensile Stress Surface compressive stress (CS), a depth of a compressive stress layer (DOL) and tensile stress were obtained by passing light through a chemical strengthening layer of a chemical strengthened glass by a birefringence imaging system Abrio (manufactured by Tokyo Instruments, Inc.) to measure retardation of a surface compressive stress layer, and calculating using a photoelastic constant of a glass.

(3) Slow Cracking Height

Slow cracking height was measured by a sandpaper falling ball test. 15 chemical strengthened glasses cut into a size of 50 mm×50 mm were prepared, 15 glasses were sequentially arranged on a granite table, a stainless steel sphere having a diameter of 0.75 inch and a weight of 28 g or 4 g was dropped from above in the state that the upper surface of a glass is brought into contact with a rubbing surface of sandpaper P30 (JIS R6252, 2006), a simple average of a height of a falling ball when destruction was calculated, and the value was defined as an average destruction height.

(4) Three-Point Bending Strength

Three-point bending strength was conducted by the method of a three-point bending test under the conditions of span: 30 mm and crosshead speed: 0.5 mm/min. After chemical strengthening a glass sheet having a thickness of 1 mm and a size of 5 mm×40 mm, both sides thereof having been mirror polished with cerium oxide, a Vickers indenter was hit in a force of 20 kgf=196N to a center of each glass sheet using a Vickers durometer under the conditions of temperature: 20 to 28° C. and humidity: 40 to 60% to form indentation, and bending strength (unit: MPa) was measured.

(5) Correlation Between Slow Cracking Height and CS×DOL

A glass for chemical strengthening having the following composition manufactured by a float process was cut into a size of 50 mm×50 mm, ground using #1000 grind stone, and then polished using cerium oxide to convert the surface to a mirror surface. Thus, a sheet glass having a thickness of 1 mm was prepared.

Composition of glass for chemical strengthening: 72.5% of $SiO_2$, 6.2% of $Al_2O_3$, 8.5% of MgO and 12.8% of $Na_2O$ After subjecting the glass obtained to an ion-exchange treatment using potassium nitrate, properties of the chemical strengthened glass obtained were evaluated. Compressive stress and a depth of a compressive stress layer were measured using a glass surface stress meter (FSM-6000LE) manufactured by Orihara Manufacturing Co., Ltd. The results are shown in Table 1 and FIG. 13.

TABLE 1

| | a | b | c | d | e | f | g |
|---|---|---|---|---|---|---|---|
| Compressive stress (MPa) | 671 | 657 | 737 | 645 | 657 | 690 | 668 |
| Depth of compressive stress layer (μm) | 38 | 44 | 15 | 52 | 44 | 26 | 20 |
| CS × DOL (MPa · mm) | 26 | 29 | 11 | 33 | 29 | 18 | 13 |
| Slow cracking height (cm), weight of falling ball: 4 g | 21 | 20 | 30 | 18 | 19 | 25 | 32 |

As shown in Table 1 and FIG. 13, it was seen that when the compressive stress of a glass is increased and additionally the depth of the compressive stress layer is increased, slow cracking is liable to occur.

A glass for chemical strengthening having the composition shown in Table 2 was cut into a size of 50 mm×50 mm, ground using #1000 grind stone and then polished using cerium oxide to convert the surface to a mirror surface. Thus, a sheet glass having a thickness of 1 mm was prepared.

After treating the glass obtained under the conditions shown in Tables 3 and 4, properties of the chemical strengthened glass were evaluated. The results obtained are shown in Tables 3 and 4. Compressive stress, depth of a compressive stress layer and tensile stress were measured by a birefringence imaging system Abrio (manufactured by Tokyo Instruments, Inc.). In Tables 3 and 4, "HV" means a position (μm) at which compressive stress is half of the value of the surface compressive stress.

Figure 14:
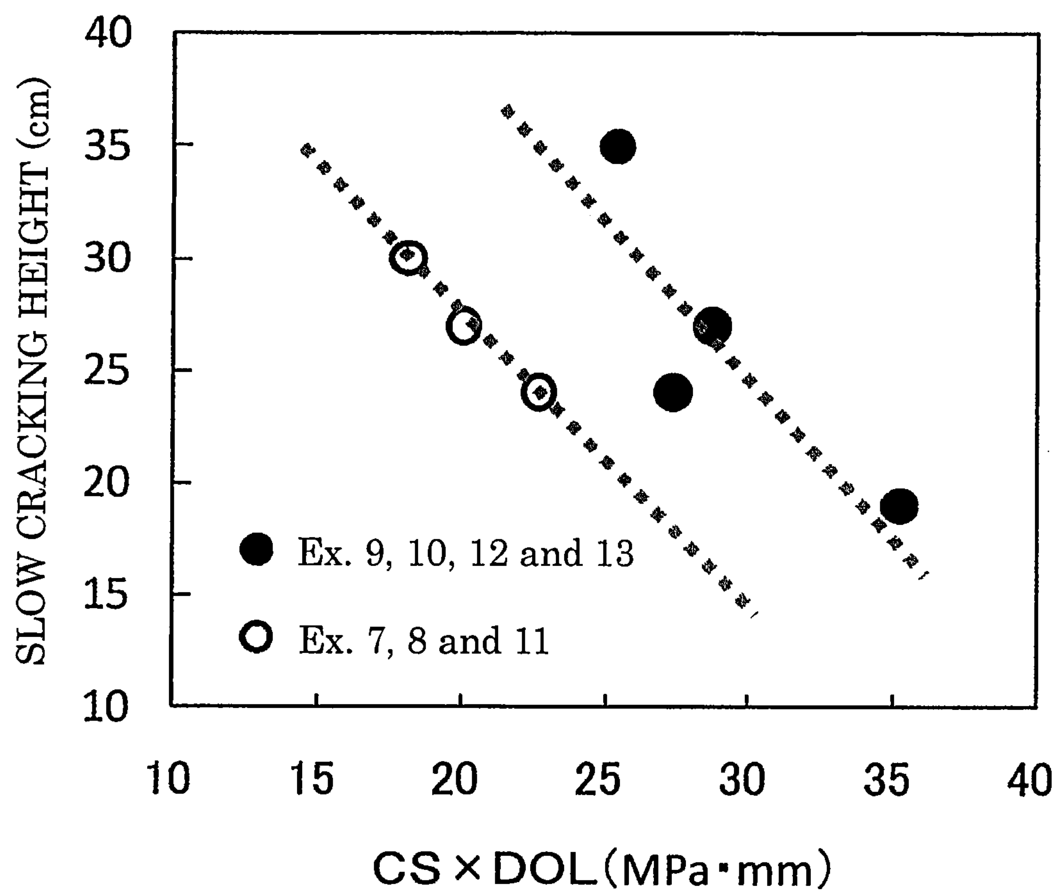
FIG. 14 shows the relationship of surface compressive stress (CS), depth of a compressive stress layer (DOL) and slow cracking height.

The results obtained by plotting Examples 7 to 13 are shown in FIG. 14 in which the horizontal axis is CS×DOL and the vertical axis is slow cracking height. In FIG. 14, ● is the results obtained by plotting Examples 9, 10, 12 and 13, and ○ is the results obtained by plotting Examples 7, 8 and 11.

TABLE 2

| | Glass A | Glass B | Glass C |
|---|---|---|---|
| $SiO_2$ | 70 | 65.6 | 72.5 |
| $Al_2O_3$ | 6 | 11.7 | 6.2 |
| $B_2O_3$ | 0 | 0.4 | 0 |
| MgO | 2 | 0 | 8.5 |
| CaO | 0 | 0.8 | 0 |
| $Li_2O$ | 16 | 10.7 | 0 |
| $Na_2O$ | 4 | 9.6 | 12.8 |
| $K_2O$ | 0 | 0.1 | 0 |
| $ZrO_2$ | 2 | 1.1 | 0 |
| d | 2.45 | 2.45 | 2.41 |
| α | 78 | 88 | 74 |
| Tg | 503 | 513 | 617 |
| T2 | 1499 | 1588 | 1734 |
| T4 | 1037 | 1094 | 1256 |

TABLE 3

| | Example 1 | Example 2 | Example 3 | Example 4 | Example 5 | Example 6 |
|---|---|---|---|---|---|---|
| Glass | A | A | A | A | B | B |
| First strengthening, salt | $NaNO_3$ | $NaNO_3$ | $NaNO_3$ | $NaNO_3$ | $NaNO_3$ | $NaNO_3$ |
| First strengthening, temperature | 375 | 375 | 375 | 350 | 375 | 375 |
| First strengthening, time | 30 | 60 | 30 | 30 | 30 | 30 |
| Intermediate heat treatment, temperature | — | — | — | 375 | — | — |
| Intermediate heat treatment, time | — | — | — | 90 | — | — |
| Second strengthening, salt | | | $KNO_3$ | $NaNO_3$ | | $KNO_3$ |
| Second strengthening, temperature | | | 425 | 350 | | 425 |
| Second strengthening, time | | | 30 | 15 | | 30 |
| Compressive stress (MPa) | 380 | 400 | 330 | 324 | 340 | 384 |
| Depth of compressive stress layer (μm) | 46 | 57 | 87 | 75 | 54 | 98 |
| Tensile stress (MPa) | 25 | 39 | 23 | 23 | 19 | 22 |
| Half stress depth (μm) | 13 | 22 | 3 | 13 | 12 | 3 |
| CS × DOL (MPa · mm) | 18 | 23 | 29 | 24 | 18 | 38 |
| (HW)/DOL | 0.29 | 0.39 | 0.03 | 0.17 | 0.24 | 0.03 |
| Slow cracking height (cm), weight of falling ball: 28 g | 4.9 | 4.8 | 6.9 | 7.4 | 6.3 | 7.4 |
| Three-point bending strength (MPa), 20 kg, Vickers | 387 | 261 | 27 | 174 | 198 | 43 |
| CS × DOL × H | 85 | 109.3 | 197.6 | 178.5 | 116.3 | 277 |

TABLE 4

| | Example 7 | Example 8 | Example 9 | Example 10 | Example 11 | Example 12 | Example 13 |
|---|---|---|---|---|---|---|---|
| Glass | A | A | A | A | C | C | C |
| First strengthening, salt | $NaNO_3$ | $NaNO_3$ | $NaNO_3$ | $NaNO_3$ | $KNO_3$ | $KNO_3$ | $KNO_3$ |
| First strengthening, temperature | 375 | 375 | 350 | 350 | 450 | 425 | 425 |
| First strengthening, time | 30 | 60 | 30 | 60 | 360 | 210 | 420 |
| Intermediate heat treatment, temperature | — | — | 350 | 350 | — | 450 | 450 |
| Intermediate heat treatment, time | — | — | 180 | 135 | — | 1920 | 1920 |
| Second strengthening, salt | — | — | $NaNO_3$ | $NaNO_3$ | — | $KNO_3$ | $KNO_3$ |
| Second strengthening, temperature | | | 350 | 350 | | 425 | 425 |
| Second strengthening, time | — | — | 15 | 30 | — | 90 | 210 |
| Compressive stress (MPa) | 425 | 405 | 374 | 402 | 604 | 512 | 563 |
| Depth of compressive stress layer (μm) | 43 | 56 | 68 | 68 | 33 | 56 | 63 |
| Tensile stress (MPa) | 23 | 34 | 27 | 35 | 33 | 23 | 34 |
| Half stress depth (μm) | 14 | 18 | 12 | 14 | 15 | 8 | 11 |

TABLE 4-continued

| | Example 7 | Example 8 | Example 9 | Example 10 | Example 11 | Example 12 | Example 13 |
|---|---|---|---|---|---|---|---|
| CS × DOL (MPa · m) | 18 | 23 | 25 | 27 | 20 | 29 | 35 |
| (HW)/DOL | 0.32 | 0.32 | 0.17 | 0.2 | 0.45 | 0.14 | 0.18 |
| Slow cracking height (cm), weight of falling ball: 4 g | 30 | 24 | 35 | 24 | 27 | 27 | 19 |
| Three-point bending strength (MPa), 20 kg, Vickers | 387 | 261 | 187 | — | — | — | — |
| CS × DOL × H | 544 | 545 | 889 | 656 | 542 | 775 | 669 |

As shown in Table 3, in Examples 3 and 6 in which HW/DOL is less than 0.05, the three-point bending strength was low as compared with the case where HW/DOL is 0.05 or more. Furthermore, in Examples 1, 2 and 5 in which HW/DOL exceeds 0.23, the slow cracking height was low as compared with Example 4 in which HW/DOL is 0.23 or less.

Furthermore, as shown in Table 14, it was seen that in any cases of Examples 9, 10, 12 and 13 in which HW/DOL is 0.23 or less and Examples 7, 8 an 11 in which HW/DOL exceeds 0.23, the slow cracking height is decreased with increasing the value of CS×DOL, but in the comparison regarding CS×DOL, Examples 9, 10, 12 and 13 in which HW/DOL is 0.23 or less can maintain high slow cracking height as compared with Examples 7, 8 and 11 in which HW/DOL exceeds 0.23.

It was seen from those results that when HW/DOL of a glass is 0.05 or more, the abraded strength can be improved. It was further seen that when HW/DOL of a glass is 0.23 or less, durability to slow cracking can be improved.

Although the present invention has been described in detail and by reference to the specific embodiments, it is apparent to one skilled in the art that various modifications or changes can be made without departing the spirit and scope of the present invention. This application is based on Japanese Patent Application No. 2011-276203 filed on Dec. 16, 2011, the disclosure of which is incorporated herein by reference.

The invention claimed is:

1. A cover glass for a display, wherein a depth of a compressive stress layer (DOL) is 30 μm or more, a surface compressive stress is 300 MPa or more, a position (HW) at which a compressive stress is half of a value of the surface compressive stress is a position of 8 μm or more from a glass surface, and the depth of the compressive stress layer (DOL) and the position (HW) at which the compressive stress is half of the value of the surface compressive stress satisfy the following formula:

$$0.05 \le HW/DOL \le 0.23 \quad (1).$$

2. The cover glass of claim 1, wherein the depth of the compressive stress layer (DOL) is 75 μm or less.

3. The cover glass of claim 1, wherein the cover glass has a thickness of 1.2 mm or less.

4. The cover glass of claim 1, wherein the cover glass has a composition of 50 to 80% of $SiO_2$, 2 to 25% of $Al_2O_3$, 0 to 10% of $Li_2O$, 0 to 18% of $Na_2O$, 0 to 10% of $K_2O$, 0 to 15% of MgO, 0 to 5% of CaO and 0 to 5% of $ZrO_2$ in terms of mol %.

5. The cover glass of claim 1, wherein the cover glass has a composition of 50 to 74% of $SiO_2$, 1 to 10% of $Al_2O_3$, 6 to 14% of $Na_2O$, 3 to 11% of $K_2O$, 2 to 15% of MgO, 0 to 6% of CaO and 0 to 5% of $ZrO_2$ in terms of mol %, and wherein the total content of $SiO_2$ and $Al_2O_3$ is 75% or less, the total content of $Na_2O$ and $K_2O$ is 12 to 25%, and the total content of MgO and CaO is 7 to 15%.

6. The cover glass of claim 1, wherein the cover glass has a composition of 68 to 80% of $SiO_2$, 4 to 10% of $Al_2O_3$, 5 to 15% of $Na_2O$, 0 to 1% of $K_2O$, 4 to 15% of MgO and 0 to 1% of $ZrO_2$ in terms of mol %.

7. A method for manufacturing the cover glass of claim 1, the method comprising:

forming a compressive stress layer on a glass surface by subjecting a glass to an ion-exchange treatment;

heat-treating the glass at a temperature 50° C. or more lower than a glass transition temperature; and further forming a compressive stress layer on the glass surface by subjecting the glass to an ion-exchange treatment.

8. The method of claim 7, wherein the ion-exchange treatments are performed at a temperature 50° C. or more lower than the glass transition temperature.

* * * * *